United States Patent
Magna et al.

(10) Patent No.: US 7,119,045 B2
(45) Date of Patent: Oct. 10, 2006

(54) CATALYST FOR HYDROREFINING AND/OR HYDROCONVERSION AND ITS USE IN HYDROTREATMENT PROCESSES FOR BATCHES CONTAINING HYDROCARBONS

(75) Inventors: Lionel Magna, Rueil Malmaison (FR); Loiec Rouleau, Charly (FR); Stephane Kressmann, Serezin du Rhone (FR); Denis Jean Marie Guillaume, Rueil Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 219 days.

(21) Appl. No.: 10/445,314

(22) Filed: May 27, 2003

(65) Prior Publication Data

US 2004/0020829 A1    Feb. 5, 2004

(30) Foreign Application Priority Data

May 24, 2002    (FR) ................... 02 06402

(51) Int. Cl.
 *B01J 23/00* (2006.01)
(52) U.S. Cl. .................. 502/313; 502/325; 502/337
(58) Field of Classification Search ............... 502/305, 502/313, 315, 321, 325, 337
See application file for complete search history.

(56) References Cited

U.S. PATENT DOCUMENTS

| | | | |
|---|---|---|---|
| 4,588,709 A * | 5/1986 | Morales et al. | 502/314 |
| 4,743,574 A | 5/1988 | Morales et al. | |
| 5,089,463 A * | 2/1992 | Johnson | 502/313 |
| 5,221,656 A * | 6/1993 | Clark et al. | 502/315 |
| 5,545,602 A * | 8/1996 | Nelson et al. | 502/314 |
| 6,015,485 A * | 1/2000 | Shukis et al. | 208/112 |
| 6,043,187 A | 3/2000 | Harle et al. | |
| 6,387,248 B1 * | 5/2002 | Sherwood et al. | 208/216 PP |
| 6,436,280 B1 * | 8/2002 | Harle et al. | 208/216 R |
| 6,551,500 B1 * | 4/2003 | Ishida et al. | 208/111.3 |

FOREIGN PATENT DOCUMENTS

| | | |
|---|---|---|
| EP | 0704239 | 4/1996 |
| EP | 0714699 | 6/1996 |
| EP | 1060794 | 12/2000 |
| FR | 2764213 | 12/1998 |

* cited by examiner

*Primary Examiner*—Jonathan Johnson
(74) *Attorney, Agent, or Firm*—Millen, White, Zelano & Branigan, P.C.

(57) ABSTRACT

This invention relates to a catalyst for hydrorefining and/or hydroconversion of hydrocarbon-containing feedstocks that contain compounds whose boiling point is higher than 520° C. and that contain sulfur and possibly metals, as well as its use in hydrorefining and/or hydroconversion processes of heavy feedstocks. A petroleum residue of atmospheric distillation (RA) or of vacuum distillation (RSV) or a deasphalted oil (DAO) are representative feedstocks of the feedstocks treated within the scope of this invention.

19 Claims, No Drawings

CATALYST FOR HYDROREFINING AND/OR HYDROCONVERSION AND ITS USE IN HYDROTREATMENT PROCESSES FOR BATCHES CONTAINING HYDROCARBONS

This invention relates to a catalyst for hydrorefining and/or hydroconversion of hydrocarbon-containing feedstocks containing compounds whose boiling point is higher than 520° C. and containing sulfur and possibly metals, as well as its use in hydrorefining and/or hydroconversion processes of heavy feedstocks. A petroleum residue of atmospheric distillation (RA) or of vacuum distillation (RSV) or a deasphalted oil (DAO) are representative feedstocks of the feedstocks treated within the scope of this invention.

PRIOR ART

One skilled in the art knows that it is desirable to convert these heavy fractions containing compounds whose boiling point is higher than 520° C. into lighter fractions that are more economically viable. Further, hydrorefining or hydroconversion of these feedstocks also makes it possible to purify them and notably to reduce their sulfur content greatly, thanks to hydrodesulfurization (HDS) reactions, as well as their metal content, basically nickel and vanadium, thanks to hydrodemetallization (HDM) reactions.

The best performing catalysts to achieve these reactions are compounds of sulfide phases dispersed on a porous oxide substrate. The mixed sulfides, consisting simultaneously of a sulfide of a metal from group VIB of the periodic table as well as of a sulfide of a metal from group VIII of the periodic table are particularly suitable for hydrorefining reactions.

It is also known to one skilled in the art that the porous texture of the substrate must be adapted to take into consideration the diffusion limitations encountered during hydrorefining/hydroconversion of these heavy fractions. It is now recognized that it is preferable to perform these reactions with a bimodal catalyst simultaneously containing mesopores and macropores. We define mesopores as pores with a diameter of less than 500 Å and macropores as pores with a diameter of greater than 500 Å, the porosity being measured by the mercury intrusion method.

These catalysts exhibit significant deactivation over time. This deactivation is tied in part to the accumulation of solid deposits in the pores of the catalyst, deposition that continues until part of the porous network of the catalyst is completely blocked. The deposits consist simultaneously of insoluble carbon-containing residues in the toluene that is defined as being coke and sulfide of vanadium and of nickel, these latter coming from hydrodemetallization reactions. These deposits are more concentrated at the periphery of the catalyst grains than at their center. Likewise, the pore openings are obstructed more quickly than their other parts. The obstruction of the pores is coupled with a progressive reduction in their diameter, which causes an increased limitation in the diffusion of molecules, thus an accentuation of the heterogeneity of the deposit from the periphery toward the interior of the porous particles to the point that complete obstruction of the pores opening toward the exterior of the catalyst grains occurs rapidly: the catalyst is then deactivated.

U.S. Pat. No. 4,880,525 describes, for example, the preparation of a bimodal catalyst typically used in this type of application. It consists of macropores (at least 20% of the pore volume in the pores larger than 350 Å) and mesopores of moderate size, since at least 20% of the pore volume must be developed in mesopores less than 70 Å. According to EP 1 060 794, the presence of at least 0.32 $cm^3/g$ of macropores (larger than 500 Å), as well as mesopores of average size between 80 and 200 Å makes it possible to obtain a catalyst having simultaneously high initial activity and great capacity to retain metals and thus a long service life. The proportion of macropores is the subject of debate since, according to U.S. Pat. No. 5,397,456, there is a compromise between increasing the macroporosity to facilitate the diffusion of coarse molecules and decreasing the macroporosity to limit the poisoning of the interior of the grains. According to these authors, 11 to 18% of the pore volume present among pores greater than 250 Å would be a good proportion. Further, according to U.S. Pat. No. 5,827,421, a catalyst having a large pore volume (0.82 to 0.98 $cm^3/g$) and the particular feature of having large mesopores (55 to 64.5% of the pore volume between 110–130 Å±50 Å) and a large fraction of macropores (27 to 34% of the pore volume above 250 Å) would be particularly efficient when what is involved is maximizing the conversion of these feedstocks while limiting the formation of sediments in the conversion products and while maximizing their desulfurization.

While the impact of the pore distribution of the catalyst on performance has been studied extensively, there is rare mention of the effect of the quantity of active phase and especially of the proportion among the elements introduced. The atomic ratio between the group VIII element and the group VI element considered usually optimal is between 0.4 and 0.6 group VIII atoms/group VI atoms. We have observed that, independently of the pore texture of the catalyst, the deactivation of the catalyst is slowed, and thus the service life of the catalyst is prolonged, when the content of group VIII metal is limited. Without wishing to elaborate on any one theory of deactivation, it can be thought that the reduction in the group VIII metal content limits the chemical activity of the catalyst and thus makes it possible to have better diffusion of the molecules at the origin of the deposits within the catalyst. The deposits are then more uniformly distributed in the catalyst volume and obstruction of the porosity is delayed. Thus, the atomic ratio of group VIII/group VI is advantageously selected to be less than 0.4 atom/atoms. A preferred atomic ratio is equal to 0.3 atom/atoms.

DESCRIPTION OF THE INVENTION

The invention relates to a catalyst for hydrorefining and/or hydroconversion of hydrocarbon-containing feedstocks containing compounds whose boiling point is greater than 520° C., sulfur and metals.

The catalyst according to the invention contains a porous substrate, in general based essentially on aluminum, and at least one catalytic metal selected from among the elements of group VIB and possibly at least one non-noble catalytic metal selected from among the elements of group VIII of the periodic table.

Preferably, the group VIB metal is molybdenum or tungsten, even more preferably molybdenum. Preferably, the group VIII metal is nickel or cobalt, still more preferably nickel. An advantageous catalyst is a catalyst combining nickel and molybdenum. Another advantageous catalyst is a catalyst based on molybdenum.

The quantity of group VIB metal, expressed in % by weight of oxide relative to the final catalyst weight, can be between 1 and 30%, preferably between 5 and 20%.

The quantity of non-noble group VIII metal, expressed in % by weight of oxide relative to the finished catalyst weight, is less than 2.2% by weight, preferably less than 2%, and still more preferably less than 1.9%.

The quantity of non-noble group VIII metal, expressed in % by weight of oxide relative to the finished catalyst weight, is generally at least 0.1%, even higher than 0.1%.

In one embodiment, the catalyst does not contain a non-noble group VIII metal (0% by weight of oxide relative to the finished catalyst weight).

A highly preferred catalyst comprises a quantity of non-noble group VIII metal, expressed in % by weight of oxide relative to the finished catalyst weight, between 0.1 and 1.9%.

The atomic ratio between the non-noble group VIII element and the group VIB element is advantageously selected to be less than 0.4 atom/atoms, advantageously less than 0.35 atom/atoms. A preferred atomic ratio is equal to or less than 0.3 atom/atoms.

The catalysts according to the invention can be prepared by all adequate methods. Preferably the substrate, for example a commercial alumina, is impregnated by an aqueous solution containing metallic salts.

More specifically, the process for preparing the supported catalyst of this invention comprises the following steps:

a) The substrate, for example a commercial alumina, is impregnated by an aqueous solution containing metals from group VIB and group VIII, b) the moist solid is left in a humid atmosphere at a temperature of between 10 and 80° C., c) the solid obtained in step b) is dried at a temperature of between 60 and 150° C., d) the solid obtained in step c) is calcined at a temperature of between 150 and 800° C.

The matrix is preferably impregnated by the so-called "dry" impregnation method that is well known to one skilled in the art. The impregnation is performed very preferably in a single step with a solution containing all the constituent elements of the final catalyst (co-impregnation). Other impregnation sequences can be used to obtain the catalyst of this invention.

It is also possible to introduce some of the metals, or all of them, during the preparation of the substrate, notably during the formation step.

The sources for group VIB elements that can be used are well known to one skilled in the art. For example, among molybdenum and tungsten sources, there can advantageously be used oxides, hydroxides, molybdic and tungstic acids and their salts, in particular the ammonium salts such as ammonium molybdate, ammonium heptamolybdate, ammonium tungstate, phosphomolybdic and phosphotungstic acids and their salts, acetyl acetonates, xanthates, fluorides, chlorides, bromides, iodides, oxyfluorides, oxychlorides, oxybromides, oxyiodides, carbonyl complexes, thiomolybdates, and carboxylates. Preferably the oxides and ammonium salts, such as ammonium molybdate, ammonium heptamolybdate, and ammonium tungstate, are used.

The sources of group VIII elements that can be used are known and are, for example, the nitrates, sulfates, phosphates, halogenides, carboxylates, such as acetates, and the carbonates, hydroxides, and oxides.

The catalyst of this invention also includes a porous mineral matrix, usually amorphous or poorly crystallized. It is generally selected from the group that is formed by alumina, silica, silica-alumina, magnesia, clay, titanium oxide, zirconium oxide, lanthanum oxide, cerium oxide, the aluminum phosphates, boron phosphates, or a mixture of at least two of the above-mentioned oxides. Combinations of alumina-boron oxide, alumina-titanium oxide, alumina-zirconia and titanium oxide-zirconia, the aluminates, of magnesium, calcium, barium, manganese, iron, cobalt, nickel, copper and zinc can also be selected as well as the mixed aluminates and titanates (of zinc, nickel, and cobalt), alone or in a mixture.

It is preferable to use matrices containing alumina, known by one skilled in the art in all these forms, for example gamma alumina.

The catalysts described in this invention are shaped in the form of grains of different shapes and sizes. They are used generally in the form of cylindrical or polylobar extrudates such as bilobar, trilobar, or polylobar in a straight or twisted shape. They can also be used in the form of balls.

They generally have a specific surface area measured by adsorption of nitrogen according to the BET method (Brunauer, Emmett, Teller, J. Am. Chem. Soc., Vol. 60, 309–316 (1938)) of between 50 and 600 $m^2/g$, a pore volume measured by mercury porosimetry between 0.2 and 1.5 $cm^3/g$, even more preferably between 0.5 and 1.5 $cm^3/g$, more preferably between 0.5 and 1 $cm^3/g$. The pore size distribution, measured by mercury porosimetry, can be monomodal, bimodal, or polymodal, porosities containing macropores being preferable. Mercury porosimetry is performed over a range of pressure of mercury intrusion from 1.8 to 60,000 PSI, with a mercury wetting angle of 140° and a surface tension of 480 $dyne/cm^2$.

In a preferred catalyst, the BET surface area is greater than 50 $m^2/g$, and the pore volume corresponding to pores with a diameter of greater than 500 Å is at least 0.1 $cm^3/g$.

The distribution of mesopores of the substrate used for the catalyst according to the invention is centered on a diameter of between 40 and 170 Å.

This catalyst can be used in any type of process making it possible to convert feedstocks containing compounds whose boiling point is higher than 520° C. and also containing sulfur and possibly metals. The feedstocks can be, for example, atmospheric or vacuum residues resulting from direct distillation, deasphalted oils, residues resulting from conversion processes such as, for example, those resulting from coking, hydroconversion in a fixed bed, boiling bed, or else in a moving bed. These feedstocks can be used as is or diluted by a hydrocarbon-containing fraction or a mixture of hydrocarbon-containing fractions selected from the group formed by an oil from a light fraction (LCO according to the acronym for the English term Light Cycle Oil), a heavy fraction oil (HCO according to the acronym for the English term Heavy Cycle Oil), a decanted oil (DO according to the acronym for the English term Decanted Oil), a slurry, and gas oil fractions, notably those obtained by vacuum distillation, referred to according to the English terminology as VGO (vacuum gas oil). Heavy feedstocks generally have initial boiling points higher than 300° C., more than 1% by weight of molecules having a boiling point above 520° C., an S content greater than 1% by weight, a nitrogen content higher than 100 ppm by weight, a content of Ni+V metals higher than 1 ppm by weight, an asphaltene content, precipitated in heptane, higher than 0.2% by weight, as well as significant viscosities, typically higher than 10 Cst at 100° C.

In one embodiment, part of the converted effluents can be recycled upstream from the unit performing the hydroconversion/hydrorefining process.

This catalyst can be used notably in a fixed bed process, whose essential goal is to eliminate the metals and sulfur, and to lower the average boiling point of these hydrocarbons. In a fixed bed process, the catalyst is generally used at a temperature of between 320 and 450° C., preferably 350 to 410° C., under a partial pressure of hydrogen of about 3 MPa to about 30 MPa, preferably 10 to 20 MPa, at a volumetric flow rate of about 0.05 to 5 volumes of feedstock per volume of catalyst and per hour, preferably 0.2 to 0.5 volume of feedstock per volume of catalyst and per hour, and with a ratio of gaseous hydrogen to liquid hydrocarbon feedstock of between 200 and 5000 normal cubic meters per cubic meter, preferably 500 to 1500 normal cubic meters per cubic meter.

The catalyst of this invention can also be used in a boiling bed process for the same feedstocks. In such a process, the catalyst is generally used at a temperature of between 320 and 470° C., preferably 400 to 450° C., under a partial hydrogen pressure of about 3 MPa to about 30 MPa, preferably 5 to 20 MPa, at a volumetric flow rate of about 0.1 to 10 volumes of feedstock per volume of catalyst and per hour, preferably 0.5 to 2 volumes of feedstock per volume of catalyst and per hour, and with a ratio of gaseous hydrogen to liquid hydrocarbon feedstock between 100 and 3000 normal cubic meters per cubic meter, preferably 200 to 1200 normal cubic meters per cubic meter.

The catalysts of this invention are preferably subjected to a sulfurizing treatment making it possible to transform, at least partially, the metal radicals into sulfide before they come in contact with the feedstock to be treated. This process of treatment by sulfurization is well known to one skilled in the art and can be performed by any method already described in the literature.

A conventional method of sulfurization well known to one skilled in the art consists in heating the mixture of solids under a stream of a mixture of hydrogen and hydrogen sulfide or under a stream of a mixture of hydrogen and hydrocarbons containing sulfurous molecules at a temperature of between 150 and 800° C., preferably between 250 and 600° C., generally in a flushed-bed reaction zone.

The following examples illustrate the invention described in this patent without, however, limiting its scope.

EXAMPLE 1

Preparation of Substrate Number 1 Falling under the Composition of the Catalysts of the Invention.

We fabricated an aluminum-base substrate in a large quantity so as to be able to prepare the catalysts described in the following examples starting from the same shaped substrate. To do this, we used a matrix composed of boehmite or alumina gel sold under the name of Versal 250 by the LaRoche company. This gel was mixed with an aqueous solution containing nitric acid at 52.7% (1% by weight of acid per gram of dry gel), then kneaded for 20 minutes in a Z-arm kneader (Aoustin MX2). The paste was then mixed with an aqueous solution containing 20.3% liquid ammonia (40% mol of liquid ammonia per mol of acid) for 5 minutes in the same kneader. At the end of this kneading, the paste obtained is passed through a die having cylindrical openings with a diameter equal to 1.0 mm on a piston extruder (Retma). The extrudates are then dried for one night at 120° C. and then calcined at 750° C. for two hours under a flow of humid air containing 200 g of water/kg of dry air.

This results in cylindrical extrudates 0.9 mm in diameter, having a specific surface area of 190 m²/g, a total pore volume of 0.95 cm³/g, and a mesopore distribution centered on 140 Å. This alumina further contains 0.28 cm³/g of pore volume in pores with diameters greater than 500 Å.

EXAMPLE 2

Preparation of Substrate Number 2 Falling Under the Composition of the Catalysts of the Invention.

The preparation of substrate number 2 is identical to that of substrate number 1 except that the final thermal processing of the extrudates was less advanced so as to obtain a smaller mesopore substrate. The thermal processing was performed in dry air at 600° C. for two hours. The extrudates of 0.9 mm diameter develop a specific surface area of 260 m²/g, a total pore volume of 0.93 cm³/g, and a mesopore distribution centered on 100 Å. This alumina further contains 0.27 cm³/g of pore volume in pores with a diameter greater than 500 Å.

EXAMPLE 3

Preparation of Catalyst A1 Supported on Substrate Number 1 of Example 1.

We impregnated in the dry state the substrate extruded in Example 1 by an aqueous solution containing salts of molybdenum and nickel. The molybdenum salt is ammonium heptamolybdate $(NH_4)_6Mo_7O_{24}.4H_2O$ and that of nickel was nickel nitrate $Ni(NO_3)_2.6H_2O$. After maturation at ambient temperature in a water-saturated atmosphere, the impregnated extrudates are dried for one night at 120° C. and then calcined at 500° C. for 2 hours in dry air. The final content of molybdenum trioxide is 12.5% by weight of the finished catalyst. The final nickel oxide NiO content is 3.1% by weight of finished catalyst.

The textural characteristics of catalyst A1 are recorded in Table 1.

TABLE 1

| Catalyst | A1 | B1 | C2 | D2 |
|---|---|---|---|---|
| $MoO_3$ (% by weight) | 12.5 | 12.9 | 9.7 | 10.1 |
| NiO (% by weight) | 3.1 | 1.7 | 3.2 | 0 |
| Ni/Mo (at/at) | 0.48 | 0.25 | 0.63 | 0 |
| $S_{BET}$ (m²/g) | 165 | 166 | 225 | 223 |
| Vpt (cm³/g) | 0.81 | 0.82 | 0.84 | 0.84 |
| V Hg > 500 Å (cm³/g) | 0.26 | 0.26 | 0.27 | 0.28 |

EXAMPLE 4

Preparation of Catalyst B1 Supported on Substrate Number 1 of Example 1.

We impregnated in the dry state the extruded substrate of Example 1 by an aqueous solution containing salts of molybdenum and nickel. The molybdenum salt is ammonium heptamolybdate $(NH_4)_6Mo_7O_{24}.4H_2O$ and that of nickel is nickel nitrate $Ni(NO_3)_2.6H_2O$. After maturation at ambient temperature in a water-saturated atmosphere, the impregnated extrudates are dried for one night at 120° C. then calcined at 500° C. for 2 hours in dry air. The final content of molybdenum trioxide is 12.9% by weight of finished catalyst. The final content of nickel oxide NiO is 1.7% by weight of finished catalyst.

The textural characteristics of catalyst B1 are recorded in Table 1. It is notably determined that the decrease in Ni content (catalyst A1 to B1) does not significantly modify the textural properties of the catalyst.

EXAMPLE 5

Preparation of Catalyst C2 Supported on Substrate number 2 of Example 2

We impregnated in the dry state the substrate extruded in Example 2 by an aqueous solution containing salts of molybdenum and nickel. The molybdenum salt is ammonium heptamolybdate $(NH_4)_6Mo_7O_{24}.4H_2O$ and that of nickel is nickel nitrate $Ni(NO_3)_2.6H_2O$. After maturation at ambient temperature in a water-saturated atmosphere, the impregnated extrudates are dried for one night at 120° C. then calcined at 500° C. for 2 hours in dry air. The final content of molybdenum trioxide is 9.7% by weight of finished catalyst. The final content of nickel oxide NiO is 3.2% by weight of finished catalyst.

The textural characteristics of catalyst C2 are recorded in Table 1.

EXAMPLE 6

Preparation of Catalyst D2 Supported on Substrate Number 2 of Example 2.

We impregnated in the dry state the substrate extruded in Example 2 by an aqueous solution containing molybdenum salts. The molybdenum salt is ammonium heptamolybdate $(NH_4)_6Mo_7O_{24}.4H_2O$. After maturation at ambient temperature in a water-saturated atmosphere, the impregnated extrudates are dried for one night at 120° C. then calcined at 500° C. for 2 hours in dry air. The final content of molybdenum trioxide is 10.1% by weight of finished catalyst. The catalyst does not contain any group VIII element.

The textural characteristics of catalyst D2 are recorded in Table 1.

EXAMPLE 7

Comparison of the Hydroconversion Yields of Boiling-Bed Residue.

The yield of catalysts A1 to D2 was compared during a pilot test in a Robinson-Mahoney type unit, comprising two reactors in series each containing 158 cm³ of catalyst. These reactors are modified stirred reactors and are adapted for use in a boiling bed. The catalyst comparison is performed on the Safanyia vacuum residue (RSV) whose principal characteristics are recorded in Table 2. The tests are performed at 410° C., isothermically, at 156 bars of total pressure using a VVH of 1.2 l of feedstock/l of catalyst/hour. The hydrogen throughput is such that it retains the ratio of 800 l/l of feedstock.

The unit is wet with oil by using gas oil coming from vacuum distillation or DSV, whose characteristics are recorded in Table 2.

TABLE 2

| Feedstock | DSV | RSV SAFANIYA | PB Boscan |
|---|---|---|---|
| Spec. grav. | 0.9414 | 1.0477 | 1.02 |
| Sulfur (% weight) | 2.92 | 5.31 | 5.28 |
| Nitrogen (ppm by weight) | 1357 | 4600 | 4540 |
| Viscosity (cSt) | 13.77 | 5110 | 288 |

TABLE 2-continued

| Feedstock | DSV | RSV SAFANIYA | PB Boscan |
|---|---|---|---|
| Viscosity temp. (° C.) | 100 | 100 | 100 |
| Viscosity (cSt) | 38.64 | 285 | |
| Viscosity temp. (° C.) | 70 | 150 | 150 |
| C. Conradson (% weight) | | 23.95 | 12.0 |
| C7 Asphalt. (% weight) | | 14.5 | 13.0 |
| Ni (ppm by weight) | <2 | 52 | 110 |
| V (ppm by weight) | 3.3 | 166 | 1190 |
| D1160: PI° C. | 361 | 496 | 59 |
| D1160: 05% by vol.° C. | 416 | 536 | 239 |
| D1160: 10% by vol.° C. | 431 | 558 | 313 |
| D1160: 20% by vol.° C. | 452 | | 365 |
| D1160: 30% by vol.° C. | 467 | | 486 |
| D1160: 40% by vol.° C. | 479 | | 558 |
| D1160: 50% by vol.° C. | 493 | | |
| D1160: 60% by vol.° C. | 507 | | |
| D1160: 70% by vol.° C. | 522 | | |
| D1160: 80% by vol.° C. | 542 | | |
| D1160: 90% by vol.° C. | 568 | | |
| D1160: 95% by vol.° C. | 589 | | |
| D1160: PF° C. | 598 | 558 | 593 |

The temperature is increased up to 343° C., and then the test feedstock, a Safanyia-type residue of vacuum distillation (RSV) is injected. The reaction temperature is then raised to 410° C.

The test conditions are fixed as isothermic, which makes it possible to measure the deactivation of the catalyst by direct comparison of yields at different ages. The ages are expressed here in barrels of feedstock/pound of catalyst (bbl/lb), which represents the cumulative quantity of feedstock passed over the catalyst with respect to weight of catalyst loaded.

The conversion yields, HDM and HDS, are defined as follows:

Conversion (% by weight)=((% by weight of 550° C.⁺) of feedstock−(% by weight 550° C.⁺) of formula)/((% by weight 550° C.⁺)feedstock) *100.

HDM (% by weight)=((ppm by weight of Ni+V) feedstock−(ppm by weight of Ni+V))formula)/ ((ppm by weight of Ni+V)feedstock)*100

HDS (% by weight)=((% by weight of S)feedstock−(% by weight of S)formula)/((% by weight of S)feedstock)*100.

To evaluate the stability of the products formed, a measurement according to the "P Value Shell" method is performed on the 350° C.⁺ fraction of the effluent recovered after the test.

Table 3 compares the yield of catalysts A1, B1, C2 and D2 at the beginning of the test (0.1 bbl/lb) and at the end of the test (1.4 bbl/lb).

TABLE 3

| Catalyst + Age | Conv (% weight) | HDM (% weight) | HDS (% weight) | P Value Shell |
|---|---|---|---|---|
| A1 at 0.1 bbl/lb | 55 | 90 | 85 | 1.7 |
| B1 at 0.1 bbl/lb | 55 | 90 | 83 | 1.7 |
| A1 at 1.4 bbl/lb | 52 | 70 | 56 | 1.4 |
| B1 at 1.4 bbl/lb | 52 | 74 | 60 | 1.5 |
| C2 at 0.1 bbl/lb | 55 | 80 | 78 | 1.6 |
| D2 at 0.1 bbl/lb | 55 | 83 | 64 | 1.6 |
| C2 at 1.4 bbl/lb | 52 | 65 | 56 | 1.4 |
| D2 at 1.4 bbl/lb | 52 | 65 | 58 | 1.5 |

Catalyst B1, according to the invention, thus is differentiated from catalyst A1, not according to the invention, by its lower Ni content. It is confirmed that the decrease in the Ni content has no impact on the conversion of the heavy fraction. It is observed over time that the HDS and HDM yields of catalyst B1 become higher than those of catalyst A1, i.e., catalyst B1 that contains less nickel deactivates less quickly than catalyst A1. The decrease in the NiO content does not deteriorate the stability of the 350° C.+ fraction of the effluent recovered after the test, since its P Value Shell stays largely greater than or equal to 1.4.

This result is identical for C2 catalysts, not according to the invention, and D2, according to the invention, prepared on substrate number 2 of more narrow mesoporosity. Catalyst D2, not containing nickel, offers the best yield at 1.4 bbl/lb.

EXAMPLE 8

Comparison of Hydroconversion Yields of Fixed Bed Residue.

The tests were conducted in a pilot hydrotreatment unit for petroleum residues comprising a fixed-bed tubular reactor. The reactor is filled with one liter of catalyst. The fluid flow (residue+hydrogen) is ascending in the reactor. After a step of sulfurization by circulating, in the reactor, a gas oil fraction supplemented with dimethyl disulfide at a final temperature of 350° C., the unit is operated with Boscan crude oil whose characteristics are recorded in Table 2. The tests are conducted isothermically at 390° C., 150 bars of total pressure using a VVH of 2 l of feedstock/l of cata/h. The hydrogen throughput is such that it retains the ratio of 1000 l/l of feedstock. The test conditions are fixed as isothermic, which makes it possible to measure the deactivation of the catalyst by direct comparison of yields at different ages. The ages are expressed as hours of operation with crude oil, time zero being taken upon reaching the test temperature (390° C.).

The HDS and HDM yields are defined the same way as in Example 7 and are recorded in Table 4. Also shown there is the quantity of metals deposited on the catalyst at the age mentioned. This quantity is expressed by weight of Ni+V deposited relative to the weight of the new catalyst. The quantity of Ni+V is calculated based on the HDM rate and taking into consideration the fact that the metals eliminated from the petroleum fraction are deposited on the catalyst.

TABLE 4

| Catalyst + Age | HDM (% by weight) | HDS (% by weight) | Ni + V deposited (g/100 g of new cata) |
|---|---|---|---|
| A1 at 50 hours | 78 | 60 | 8 |
| B1 at 50 hours | 77 | 55 | 6.5 |
| A2 at 400 hours | 40 | 25 | 50 |
| B2 at 400 hours | 48 | 30 | 60 |

It is noted that the decrease in the quantity of nickel in the active phase from 3.2% by weight (catalyst A1 not according to the invention) to 1.7% by weight (catalyst B1 according to the invention) has a very slight impact on the initial activity, essentially on the HDS. In contrast, the significance of a catalytic formulation that is low in nickel is clearly seen, since after 400 hours of operation under these conditions, catalyst B1 offers an activity gain simultaneously in HDM and HDS. Further, it clearly accumulated more metals than catalyst A1.

Thus, the hydroconversion catalysts of hydrocarbon-containing feedstocks containing compounds whose boiling point is higher than 520° C. and containing sulfur and metals whose active phase has a moderate nickel content, have better properties over time than catalysts whose quantity of active phase retains the usual proportions described in the prior art between the group VIII element and the group VIB element.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding French application No. 02/06.402, filed May 24, 2002 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising
a porous substrate having mesopores, and
catalytic metal consisting essentially of, 1 to 30% by weight of at least one catalytic group VIB metal in a quantity expressed in % by weight of oxide relative to the weight of the final catalyst, and
above 0 to 2.2% by weight of at least one non-noble group VIII catalytic metal in a quantity expressed in % of oxide relative to the weight of the final catalyst
and wherein the atomic ratio between the non-noble group VIII element and the group VIB element is less than 0.4, the total pore volume, measured by mercury porosimetry, is between 0.5 and 1.5 cm$^3$/g, and the distribution of mesopores of the substrate is centered on a diameter of 140 to 170 Å, and the specific surface of the catalyst is greater than 50 m$^2$/g.

2. A catalyst according to claim 1, wherein the quantity of group VIB metal expressed in % by weight of oxide relative to the weight of the finished catalyst is between 5 and 20%.

3. A catalyst according to claim 1, wherein the group VIB metal is molybdenum or tungsten.

4. A catalyst according to claim 1 comprising molybdenum.

5. A catalyst according to claim 1, wherein the BET surface area is between 50 and 600 m$^2$/g, and the pore volume in the pores with diameter greater than 500 521 is at least 0.1 cm$^3$/g.

6. A catalyst according to claim 1 containing sulfur.

7. In a catalytic process of hydroconversion and/or hydrorefining of hydrocarbon-containing feedstocks containing compounds whose boiling point is higher than 520° C. and sulfur, the improvement wherein the catalyst is according to claim 1.

8. A process of hydrorefining and/or hydroconversion of hydrocarbon-containing feedstocks according to claim 7, operating in a fixed bed at a temperature of between 320 and 450° C., under a partial hydrogen pressure of about 3 MPa to about 30 MPa, at a volumetric flow rate of about 0.05 to 5 volumes of feedstock per volume of catalyst and per hour.

9. A process of hydrorefining and/or hydroconversion of hydrocarbon-containing feedstocks according to claim 7, operating in a boiling bed at a temperature of between 320 and 470° C., under a partial hydrogen pressure of about 3 MPa to about 30 MPa, at a volumetric flow rate of about 0.1 to 10 volumes of feedstock per volume of catalyst and per hour.

10. A process according to claim 7 such that the feedstock used in the process is selected from the group consisting of atmospheric residues, vacuum residues resulting from direct distillation, deasphalted oils and residues resulting from conversion processes, said feedstock being used as is or diluted by a hydrocarbon-containing fraction or a mixture of hydrocarbon-containing fractions.

11. A process according to claim 7, wherein part of the converted effluents recycled upstream from a unit performing the process.

12. A catalyst according to claim 1, wherein the quantity of non-noble group VIII elements expressed in % by weight of oxide relative to the weight of the finished catalyst is at least 0.1%.

13. A catalyst according to claim 1, wherein the quantity of non-noble group VIII elements expressed in % by weight of oxide relative to the weight of the finished catalyst is less than 2%.

14. A catalyst according to claim 1, wherein the quantity of non-noble group VIII elements expressed in % by weight of oxide relative to the weight of the finished catalyst is less than 1.9%.

15. A catalyst according to claim 1, wherein the non-noble group VIII metal is nickel or cobalt.

16. A catalyst according to claim 1, comprising nickel and molybdenum.

17. A catalyst according to claim 16, wherein the quantity of non-noble group VIII elements expressed in % by weight of oxide relative to the weight of the finished catalyst is less than 1.9%.

18. A catalyst according to claim 17, wherein the quantity of group VIB metal expressed in % by weight of oxide relative to the weight of the finished catalyst is between 5 and 20%.

19. A process according to claim 18, wherein the VIB metal is molybdenum or tungsten and the group VIII metal is nickel or cobalt.

* * * * *

UNITED STATES PATENT AND TRADEMARK OFFICE
CERTIFICATE OF CORRECTION

PATENT NO. : 7,119,045 B2 Page 1 of 1
APPLICATION NO. : 10/445314
DATED : October 10, 2006
INVENTOR(S) : Lionel Magna It is certified that error appears in the above-identified patent and that said Letters Patent is hereby corrected as shown below:

Column 10, line 57, reads "500 521 is" should read -- 500 Å is --
Column 11, line 19, reads "effluents recycled" should read -- effluents are recycled --
Column 12, line 21, reads "wherein the VIB" should read -- wherein the group VIB --

Signed and Sealed this

Tenth Day of July, 2007

JON W. DUDAS
*Director of the United States Patent and Trademark Office*